United States Patent [19]
Lippel

[11] 3,890,499
[45] June 17, 1975

[54] DIFFERENTIAL SCANNER SYSTEM
[75] Inventor: Bernard Lippel, West Long Beach, N.J.
[73] Assignee: The United States of America as represented by the Secretary of the Army, Washington, D.C.
[22] Filed: May 15, 1970
[21] Appl. No.: 48,617

[52] U.S. Cl. ............................ 250/201; 250/209
[51] Int. Cl. ........................................ H01j 39/12
[58] Field of Search .......... 250/209, 211, 83.3, 201

[56] References Cited
UNITED STATES PATENTS

| | | | |
|---|---|---|---|
| 2,721,275 | 10/1955 | Jackson | 250/209 X |
| 2,989,643 | 6/1961 | Scanlon | 250/230 |
| 3,017,515 | 1/1962 | Welch | 250/209 |
| 3,107,302 | 10/1963 | Coleman | 250/211 |
| 3,218,909 | 11/1965 | Fain | 250/211 X |
| 3,322,954 | 5/1967 | Bell et al. | 250/209 |
| 3,430,047 | 2/1969 | Harkamp | 250/209 X |
| 3,435,235 | 3/1969 | Bezerie | 250/209 |

*Primary Examiner*—Maynard R. Wilbur
*Assistant Examiner*—D. M. Potenza
*Attorney, Agent, or Firm*—Nathan Edelberg; Robert P. Gibson; Daniel D. Sharp

[57] ABSTRACT

A coaxial differential scanner for sensing and mapping wherein the brightness of the scanned element of an object or target to be observed has subtracted from it the average brightness of its proximate surroundings. Radiation from the scanned element of the object is directed onto a first of two coaxially disposed detectors, while radiation from the surrounding area or background is directed onto the second detector. The outputs of the two detectors are combined in a differential device, with the difference output eventually used to modulate a recording source, such as a lamp whose image is scanned across a film or other recording medium in synchronism with the scanning of the scanned object.

4 Claims, 7 Drawing Figures

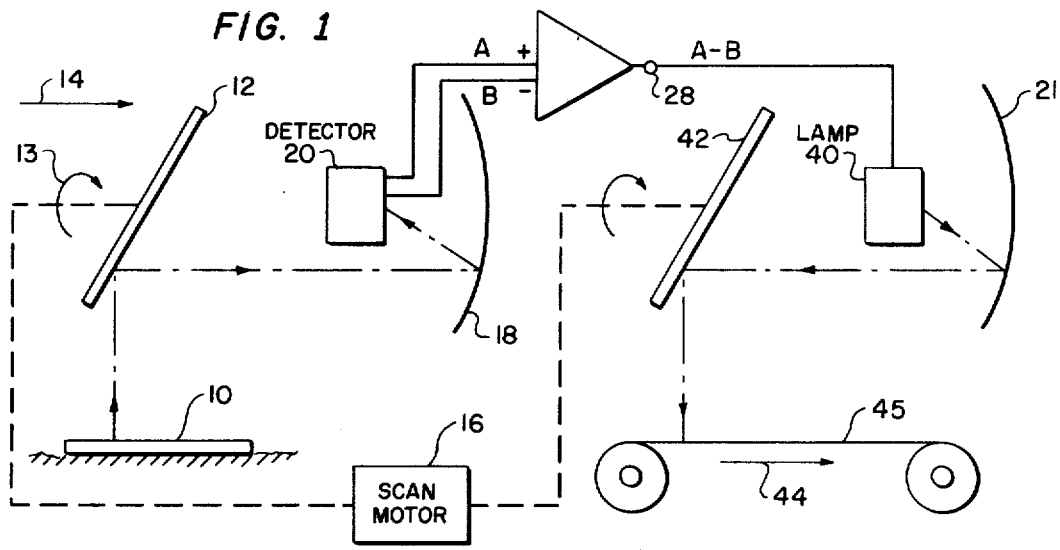
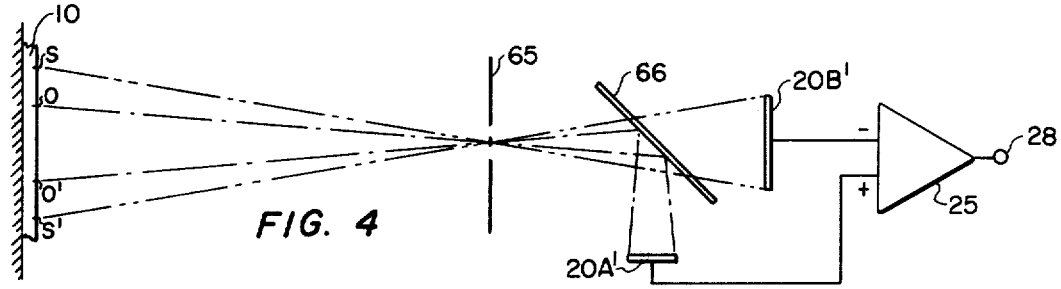
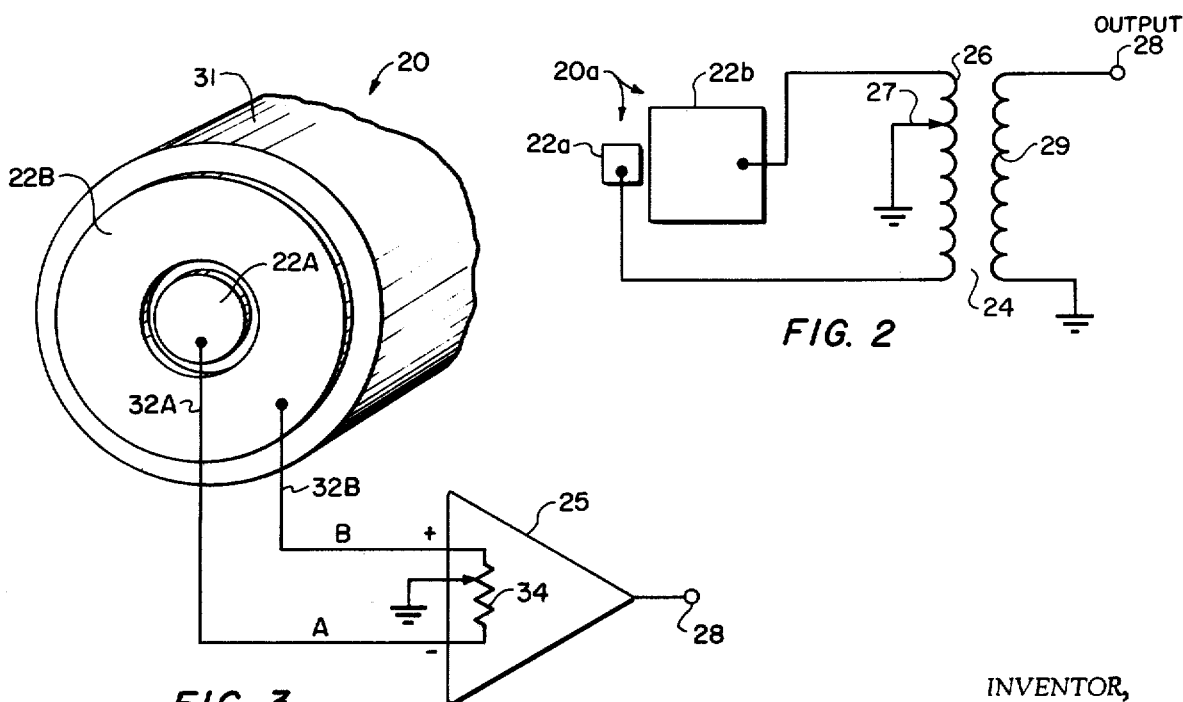

FIG. 5
FIG. 6
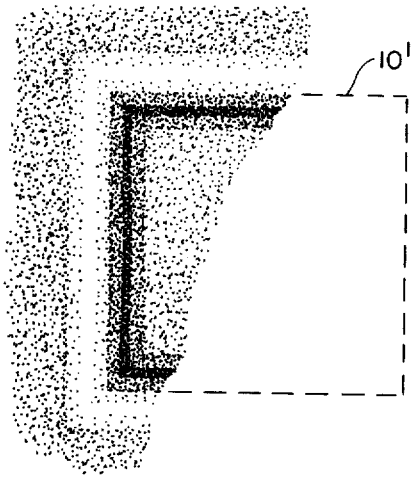
FIG. 7
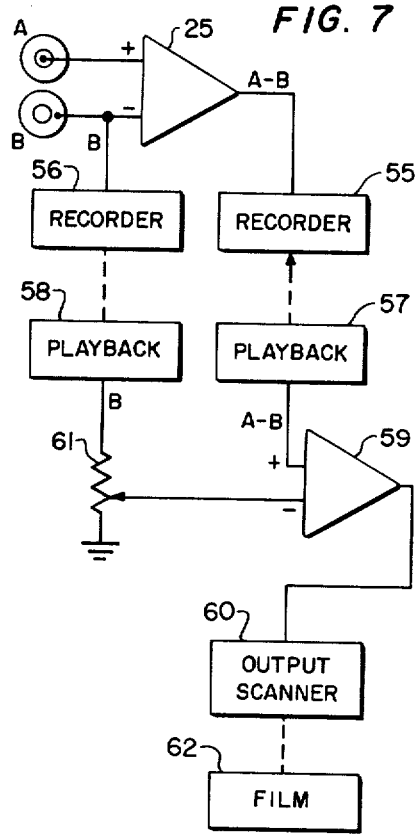
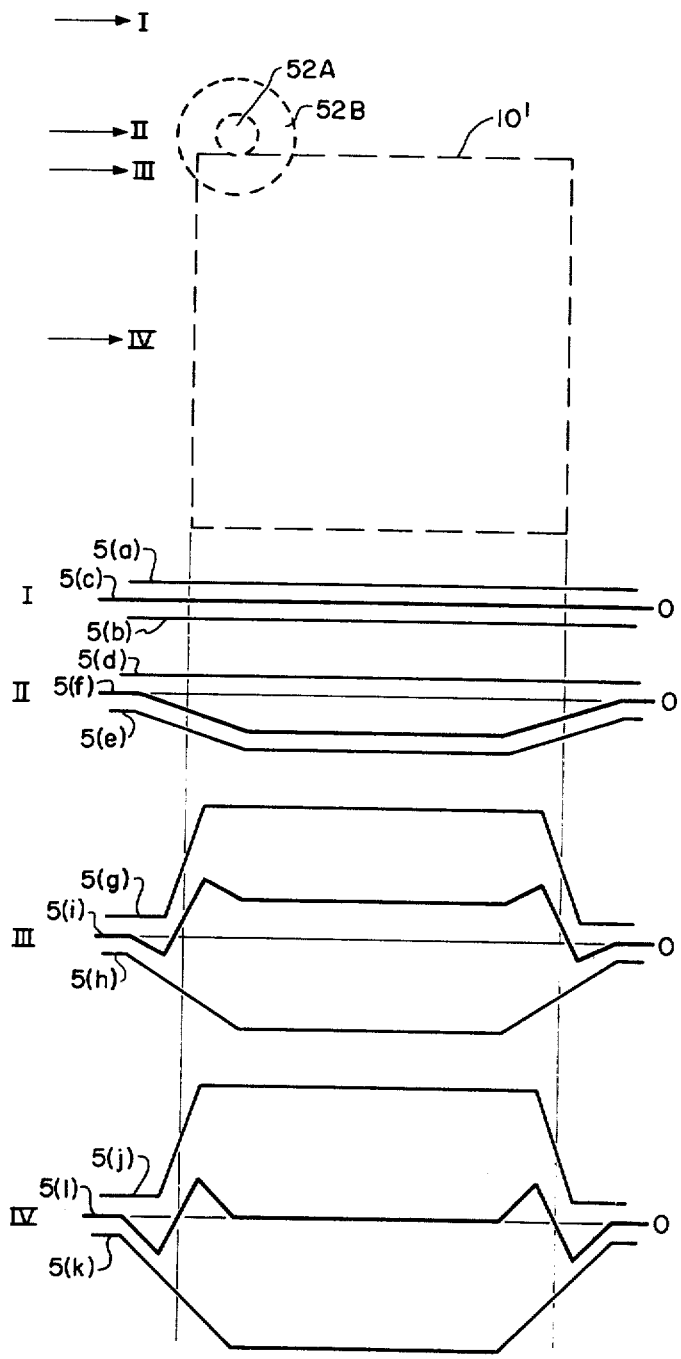
INVENTOR,
BERNARD LIPPEL
ATTORNEYS 3,890,499

DIFFERENTIAL SCANNER SYSTEM

The invention described herein may be manufactured, used, and licensed by or for the Government for governmental purposes without the payment to me of any royalty thereon.

BACKGROUND OF THE INVENTION

In prior infrared scanning and mapping systems a single detector is arranged to receive infrared radiation from an area being line-scanned and the electrical output signals from such detecting means, after amplification, is converted to a modulated light beam which records the signals, line-by-line, on a moving film strip for reconstruction of an image. With such systems, the dynamic range of the system often is limited by saturation when very bright objects are being scanned. Another problem with such systems often is the poor brightness resolution obtained because of low target-to-background contrast; that is, when a scanned object differs only slightly from the background in the intensity of its radiation from a unit area, it is difficult to perceive the object in the reconstructed image when the image has sufficient scale to show both warm and cool objects.

SUMMARY OF THE INVENTION

In accordance with the invention, the infrared scanning and recording system is provided with two separate infrared detectors, the smaller one being adapted to respond to radiation from an element of a scanned target and the larger detector responding to infrared radiation from the background area immediately surrounding the element. These two detectors are coupled to a differential device which subtractively combines an output of the larger detector with the output of the smaller detector. The subtraction thus performed at a low signal level increases the dynamic range of the system and permits the dynamic range for the boundaries of the target to be practically independent of the background brightness. By adjusting the relative amplitudes of the two detector signals at the input to the differential device, it is possible to obtain a net signal of substantially zero for a uniform background; however, balancing for zero output is not essential or always desirable. The use of dual detectors thus provides target enhancement, as well as improved dynamic range capability. If the two detectors are substantially circular or square and coaxially arranged, the symmetrical arrangement thus provided minimizes the effect of the direction of scanning upon the differential device output, unlike the case of two similar and merely juxtaposed detectors.

BRIEF DESCRIPTION OF THE DRAWINGS

FIG. 1 is a schematic diagram illustrating an infrared scanning and mapping system according to the invention;

FIG. 2 has a view showing dual detectors arranged side-by-side and useful in the system of FIG. 1;

FIG. 3 is a view showing details of dual coaxial detector means and a differential amplifier useful in the system of FIG. 1;

FIG. 4 is a view illustrating a technique for using separate optically coaxial detectors arranged in a physically nonconcentric manner;

FIG. 5 illustrates waveforms illustrating the operation of the scanning system of FIG. 1, using the detector system of FIG. 3;

FIG. 6 is a pictorial view of a portion of the image obtained with the scanning system shown in FIG. 1 and assuming the waveforms of FIG. 5; and FIG. 7 is a schematic diagram of a modification of the system of FIG. 1 in which the conventional image of the object being scanned can be recovered substantially or wholly from the difference signal normally derived with a system such as shown in FIGS. 1 to 3.

DETAILED DESCRIPTION OF THE PREFERRED EMBODIMENT

The basic input scanning system, including the infrared sensing means, of the invention is exemplified by FIG. 1, but numerous functionally equivalent systems are also suitable. Electromagnetic radiation, such as infrared or visible radiation, from an object or target 10 is scanned by means of a rotating scan mirror 12 which is rotated, as indicated by the arrow 13, by a scan motor 16 mechanically coupled to the scan mirror 12. The latter is mounted, for example, in an aircraft flying in the direction indicated by the arrow 14 over the target 10, such as an area of terrain to be investigated. The motion of the aircraft carries the scanner forward so that successive scans cover different strips or lines of the target. The rate of rotation of the scan mirror 12 and the speed of movement of the plane along the path 14 should be adjusted so that successive lines are sub stantially contiguous. The energy path from a line on object 10 is shown in FIG. 1. The radiation from each instantaneous target area is reflected by the scan mirror 12 onto a paraboloidal reflector 18 which focuses the received energy upon the detector means 20 disposed at the focal point of the reflector. Only one scan line is shown in FIG. 1. It should be noted that, as the airplane moves toward the right, successive strips of the target 10 are scanned.

One form of detector means 20 is shown in FIG. 2; this detector means 20a includes two separate detector elements 22a and 22b arranged side-by-side with each connected to a differential circuit 24. In the example shown in FIG. 2 the differential circuit compirses a primary winding 26 having one end connected to detector 22a and the other end to detector 22b. This winding is divided into two oppositely phased portions by the moveable tap 27. The secondary winding 29 coupled to winding 26 provides means for deriving a difference output at output terminal 28. Alternatively, the two detectors 22a and 22b could be connected to a differential amplifier, such as shown later in FIG. 3.

A preferred detector is the coaxial arrangement 20 shown in FIG. 3 which includes a first detector element 22A slightly spaced from and concentric with a second detector element 22B which surrounds the first detector elements 22A. The two coaxial detector elements 22A and 22B may be in the form of layers of a photosensitive material, such an indium antinomide, deposited upon the end of a dewar flask 31; the latter preferably contains a coolant such as liquid nitrogen which functions to cool the detector material. The necessary isolation between the two detectors is achieved by the slight annular spacing between the two detector layers. Detector leads 32A and 32B are attached to the respective detectors 22A and 22B and are connected to opposite polarity input teminals of a differential amplifier 25. This differential amplifier could be replaced by the differential transformer circuit 24 shown in FIG. 2. The outputs from the detectors 22A and 22B will be referred to in the various FIGS. as A and B, respectively. The contribution of each of the detectors 22A and 22B can be adjusted by potentiometer means 34 in the differential amplifier 25. It is possible, of course, to provide separate A and B preamplifiers ahead of the differential amplifier 25, and/or to adjust the relative amplitude of the two signals A and B derived from the detectors by separate gain control means disposed ahead of the differential amplifier 25. The amount of background signal, (contribution from detector 22B) subtracted from the scanned target element signal (contribution from detector 22A) can be adjusted until the net signal is zero in the case of a uniform background. For example, if the signal from each detector is proportional to its area, and the effective diameter of the surround (detector 22B) is three times the diameter of the detector 22A, so that the ratio of effective areas is eight to one, by subtracting one-eighth the surround signal B from the signal A, the net signal (A–B) at the output terminal 28 of the differential amplifier 25 would be zero for a uniform background. In some cases, however, it may be preferrable to subtract more or less surround signal than would be necessary to completely balance out a uniform background.

The difference signal (A–B) at the output terminal 28 of differential amplifier 25 (or from transformer 24 as the case may be) is applied to an energy source, such as a glow tube 40 in FIG. 1, characterized by a light output proportional to the difference signal A–B. The light from glow tube 40, which is positioned at a focal point of a suitable focusing reflector 21, is directed onto a rotating output scan mirror 42, the movement of which is synchronized with that of the scan mirror 12 and forms a tiny spot on the recording surface. The synchronism can be achieved, for example, by mechanically coupling mirror 42 to the same scan motor 16 which is used to drive scan mirror 12. The scan mirror 42, like scan mirror 12, produces flying spot scanning of a recording medium 45, such as a strip of film, moveable along the same path (indicated by arrow 44) as that of the aircraft. The path of the light beam from glow tube 40 onto the film 45 is indicated by the dashed lines in FIG. 1. As previously stated, since the scan mirror 12 is rotating, the flying spot moves along a path into the paper, thus forming a scan line. The forward motion of the vehicle provides the orthogonal sweep and causes the scan lines to follow one another. If the film speed in the recorder unit is adjusted properly, these scan lines will be on the film 45 with the correct aspect ratio, one next to the other, thus forming an image on the film.

It will be understood that, although the detector 22B is made in the form of an annulus in order to permit the convenient construction shown in FIG. 3, it may also take the form of a complete disk, similar to 22A, arranged by optical means to be concentric with 22A.

An example of such a technique is shown in FIG. 4 wherein radiation from a scanned portion O–O' of an object 10 is directed by an appropriate focusing system, indicated generally by the line 65, upon a beam splitter 66. The lines in FIG. 4 represent the central rays defining the field of view. A part of the radiation from the scanned element O–O' is reflected by the beam splitter to a detector 20A'. Radiation from the background S–S' of the object 10, which may or may not include the elemental area O–O', is focused by the focusing system 65 onto the beam splitter 66; some of this energy passes through the beam splitter and strikes the detector 20B'. The detectors 20A' and 20B' may be any suitable photodetectors, such as photosensitive layers deposited on approprite substrates in the manner shown in FIG. 3.

It will be noted that, in FIG. 3 the energy from the scanned element of the object (corresponding to O–O' in FIG. 4) is excluded from the B signal. However, to obtain the same operation of the system of FIG. 4 as is obtained with that of FIG. 3, it is only necessary to make a suitable adjustment of the control 34 in differential amplifier 25.

The manner of variation of the signals A and B on output lines of the respective detectors 22A and 22B, as well as the difference signal A–B derived from the differential amplifier 25, for the rectangular representation 10' of FIG. 5 of the rectangular target 10 of FIG. 1, is indicated by the simplified waveforms of FIG. 5. The arrows I, II, III and IV indicate typical scan lines and the circular areas 52A and 52B represent an instantaneous position of the corresponding detectors 22A and 22B of FIG. 3 relative to the target 10. The areas 52A and 52B illustrated in FIG. 5 are for the scan line indicated by arrow II. The arrows I, II, III and IV pass through the center or axis of both detector representations. In the discussion of the waveforms of FIG. 5, it is assumed that the contribution from both detectors 22A and 22B are equal. In practice, this need not be the case.

For the scan line I, it is obvious that the output from detectors 22A and 22B will be constant, since both detectors continually are traversing the assumed uniform background. The contribution from detector 22A is indicated by the waveform of FIG. 5a as having a level above an arbitrary reference level, here indicated as O. The output from detector 22B likewise will have the same level (assuming, as stated before, that the contribution from both detectors are identical). Since the output from detector 22B is subtracted from that of detector 22A by differential amplifier 25, the actual output waveform for detector 22B is shown inverted in FIG. 5b. The net waveform, that is, the output of differential amplifier 25 appearing at terminal 28 thus will be the uniform output indicated in FIG. 5c.

For the scan line II, which in FIG. 5 is spaced above the upper edge of the target representation 10' by a distance just equal to the diameter of the inner circle 52A representing detector 22A, the contribution for detector 22A will be uniform as indicated in FIG. 5d. The output from detector 22B will vary during entrance to and exit from the target representation 10'; the inverted output from detector 22B is shown by the waveform of FIG. 5e. The difference output is as shown in FIG. 5f.

For the scan line III, the outputs from detector 22A, the inversion of the output from detector 22B and the difference output from differential amplifier 25 are shown respectively by the waveforms of FIGS. 5g, 5h and 5i.

Similarly, for scan line IV, the output from detector 22A, the inversion of the output from detector 22B and the difference output from differential amplifier 25 are shown by the respective waveforms of 5j, 5k, and 5l.

It will be noted, for the waveforms of FIGS. 5i and 5l that, owing to the differencing process, the net signal from differential amplifier 25 changes in the vicinity of the leading edge of the target representation 10' from the reference level O to a negative peak (darker level) and then attains a positive peak (lighter level) before returning again to a uniform level. In the vicinity of the trailing edge of the target representation 10', the difference signal changes from the uniform central region — see FIGS. 5i and 5l — to a positive peak and then falls to a negative peak lying below the reference level before again returning to the uniform reference level. Because of this formation of alternate peaks disposed between two uniform levels, the scan image frames the target representation 10' in the manner shown in FIG. 6. In FIG. 6, not necessarily to the same scale as in FIG. 5, only a portion of the image resulting from scanning of the rectangular target area is shown; since the entire image is symmetrical, only two corners are illustrated in FIG. 6 for the sake of clarity and simplicity. The uniform image brightness corresponds to the intensity of radiation surrounding the target 10 and is shown in medium stippling. This uniform intensity gradually brightens until a bright strip, indicated in FIG. 6 as a white strip, is formed; this bright strip corresponds to the negative peak of the waveform such as that of FIG. 5l. The image then gradually decreases in intensity until a dark strip is formed corresponding to the positive peak of the waveform (see FIG. 5l) and then gradually lightens until a uniform brightness again attains. The inner dark, and outer light, outlines indicate that the target 10 radiates more intensely than the background; the reverse condition would be indicated by a reversal of the light and dark outlines.

A system is shown in FIG. 7 which allows reconstruction of a more conventional image of the target being scanned while still taking advantage of the improved target resolution and dynamic range capability of the system of FIG. 1. The difference (A−B) of the two signals A and B from detectors 22A and 22B derived from the differential amplifier 25 of FIGS. 1 and 3 can be supplied to a first recorder 55, while the signal B from detector 22B is recorded separately on a second recorder 56 synchronized with the first recorder. For example, a dual trace magnetic tape recorder could be used for both signals. At any desired time thereafter, one can play back the information recorded on recorders 55 and 56 by respective synchronous playback means 57 and 58. The electrical signal thus derived from the playback means 57 and 58, that is signals (A−B) and B, then can be applied to a summing amplifier 59 and the sum signal applied to an output scanner 60 which is similar to that shown in FIG. 1, which comprises the rotating scan mirror 42, energy source 40 and reflector 41. The scanner 60, of course, would be synchronized with the input scanner of the system of FIG. 6, which could be the same as that shown in FIG. 1 comprising rotating scan mirror 12 and reflector 18. The level of the playback signal B can be adjusted by the potentiometer 61 to the position shown in FIG. 7 so that the resultant signal from the differential amplifier 59 is equal to A. Alternatively, the potentiometer can be adjusted so that the difference signal is equal to A−B + Bn, where n is some proportional value dependent on the setting of the potentiometer 61. The modulated energy from the source at the focal point of the reflector in the output scanner 60 would be directed onto a film 62 similar to the film 45 shown in FIG. 1. The chief purpose of the synchronized recorders is to permit the image 10, to be scanned once and recorded, and the same record to be subsequently played back repeatedly with different settings of the potentiometer 61 or its equivalent.

This completes the description of the preferred embodiment of the invention illustrated herein. However, many modifications thereof will be apparent to those skilled in the art. For example, although reference has been made to an infrared scanning and mapping system, the invention can be used over any desired region of the electromagnetic wave spectrum, including the visible region. Moreover, the invention need not be restricted to the type of scanning and recording systems described and illustrated. For example, electronic scanning and scanning synchronization, such as used in television, may be used instead of the mechanical scanning system described and electronic display means could be used in lieu of recording film. Accordingly, it is desired that the invention not be limited by the particular details of the embodiment described herein except as defined by the accompanying claims.

What is claimed is:

1. A dual scanner comprising means for scanning an object emitting electromagnetic radiation, a first detector responding to the electromagentic radiation emitted from each scanned element of said object, and a second detector responsive to radiant energy emanating from a background surrounding said element said first and second detectors providing electrical signals, circuit means for subtracting an electrical signal from said second detector from an electrical signal from said first detector to provide a difference signal, means for separately recording said difference signal and said signal from said second detector on separate recording means, separate means for playing back said separately recorded signals, means for combining said separately played back signals, said combined signal being applied to an energy source to modulate the intensity thereof, and means including a scanner device synchronized with said scanning means for directing said energy onto a recording device.

2. A dual scanner as recited in claim 1 wherein said second detector surrounds said first detector and is coaxial with said first detector.

3. A scanner according to claim 1 further including means for varying the relative amplitudes of said played back signals.

4. A scanner according to claim 2 further including means for varying the relative amplitudes of said played back signals.

* * * * *